O. NEWTON.

Saw-Sets.

No. 6,051. Reissued Sept. 15, 1874.

Witnesses
Geo. A. Gowdy
Alfred H. West

Oliver Newton, Inventor
Assignee.
William Nash
By James Shepard Atty.

THE GRAPHIC CO. PHOTO-LITH. 39 & 41 PARK PLACE, N.Y.

UNITED STATES PATENT OFFICE.

OLIVER NEWTON, OF WATERTOWN, NEW YORK, ASSIGNOR TO WILLIAM NASH, OF NEW BRITAIN, CONNECTICUT.

IMPROVEMENT IN SAW-SETS.

Specification forming part of Letters Patent No. 39,323, dated July 21, 1863; reissue No. 6,051, dated September 15, 1874; application filed August 3, 1874.

*To all whom it may concern:*

Be it known that OLIVER NEWTON, of Watertown, in the county of Jefferson and State of New York, has invented a new and Improved Saw-Set; and I do hereby declare that the following is a full, clear, and exact description of the same, reference being had to the accompanying drawings, making a part of this specification, in which—

Figure 1:
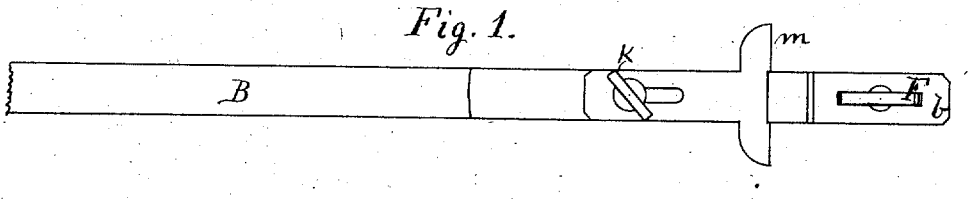
Figure 2:
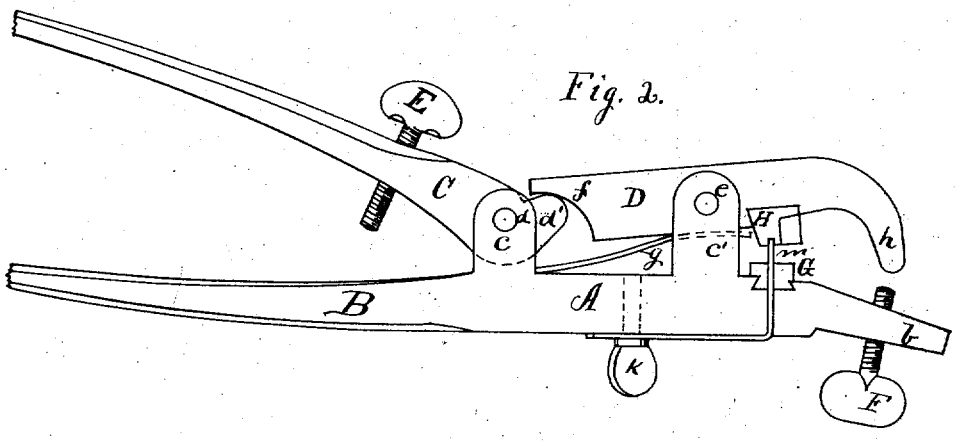

Figure 1 is an edge view of a saw-set which embodies the invention, and Fig. 2 a side view, of the same.

Similar letters of reference indicate corresponding parts in the two figures.

The object of this invention is to obtain a saw-set of simple construction, which may be adapted for setting the teeth of either large or small saws, and at the same time have a powerful purchase, so as to be capable of being readily operated, and enable even unskillful hands to set a saw in a perfect manner.

The invention consists of the construction, arrangement, and combination of certain devices, as hereinafter described.

A represents what may be termed a frame provided with an inclined end, *b*, two pair of lugs, *c c'*, and the handle B. In the pair of lugs *c* nearest the handle is a lever, C, secured thereto by means of the fulcrum-pin *d*, passing through the lugs *c*. A short lever, D, is hung in the lugs *c'* upon fulcrum-pin *e*, arranged with its end *f* overlapping the short end *d'* of the lever C, as shown in Fig. 2. A spring, *g*, is attached to the frame A in such relation to the levers D and C as to lift them, as shown in the drawing. In front of the lugs *c'* the lever D and frame A are provided upon their inner faces with jaws or dies H G secured thereto in any proper manner. Upon each side of the die G is a gage, *m*, which is secured to the frame A, and made adjustable thereon by means of a set-screw, *k*, which passes through a longitudinal slot in the body of said gage into the frame. A set-screw, F, passes through the part *b* at a point opposite the extension *h* of the lever D.

When the implement is in use, the saw-blade rests or bears against the end of the set-screw F, the tooth to be acted upon being between the two dies, with the points of the adjoining teeth bearing against the front of the gage *m*. The handles B C are then pressed together, when the faces of the dies act upon the saw-tooth, to give it the desired set, the degree of set being governed by adjusting the set-screw F, upon which the saw-blade rests, so that it may hold the blade at a greater or lesser angle to the meeting-faces of the dies. The other teeth are acted upon in like manner until the saw is set.

By the arrangement of the lever D and handle C, as shown, a powerful purchase is obtained. The set-screw E prevents the teeth being broken by an unskillful hand, a contingency of frequent occurrence in using the saw-sets in general use.

I claim as the invention of the above said NEWTON—

The rocking-lever D, carrying the die H, in combination with the lever C and the frame A, provided with the die G and handle B, as and for the purpose set forth.

WILLIAM NASH, *Assignee.*

Witnesses:

ELLEN NASH,
JAMES SHEPARD.